United States Patent
Okada

(10) Patent No.: US 6,484,032 B1
(45) Date of Patent: Nov. 19, 2002

(54) PATH CONNECTION CONTROL SYSTEM AND CONTROL METHOD THEREOF IN CDMA MOBILE COMMUNICATION SYSTEM

(75) Inventor: Masaaki Okada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/489,944

(22) Filed: Jan. 24, 2000

(51) Int. Cl.[7] .................................................. H04Q 7/20
(52) U.S. Cl. ........................ 455/456; 455/436; 455/440; 455/441
(58) Field of Search .................................. 455/455, 440, 455/441, 442, 443, 445, 456, 436

(56) References Cited

U.S. PATENT DOCUMENTS

| | | | |
|---|---|---|---|
| 5,572,221 A | | 11/1996 | Marlevi et al. |
| 5,995,835 A | * | 11/1999 | De Seze et al. ............ 455/436 |
| 6,061,337 A | * | 5/2000 | Light et al. ................. 370/331 |
| 6,085,091 A | * | 7/2000 | Yoo et al. .................... 455/441 |
| 6,138,021 A | * | 10/2000 | Arrington, Jr. et al. ..... 455/436 |
| 6,321,090 B1 | * | 11/2001 | Soliman ....................... 455/440 |
| 6,327,471 B1 | * | 12/2001 | Song ........................... 455/440 |

FOREIGN PATENT DOCUMENTS

| | | | | |
|---|---|---|---|---|
| CN | 1170493 | | 1/1998 | |
| JP | 7-30945 | | 1/1995 | |
| JP | 07322336 | * | 12/1995 | ............ H04Q/7/22 |
| JP | 2586335/1996 | | 12/1996 | |
| JP | 9-261711 | | 10/1997 | |
| JP | 10-191437 | | 7/1998 | |
| JP | 10191437 A | * | 7/1998 | ............ H04Q/7/34 |
| JP | 10-191444 | | 7/1998 | |

\* cited by examiner

*Primary Examiner*—Daniel Hunter
*Assistant Examiner*—Andrew T Harry
(74) *Attorney, Agent, or Firm*—Foley & Lardner

(57) ABSTRACT

A path connection control system in a CDMA mobile communication system can establish minimum but sufficient paths without causing degradation of communication quality due to delay of hand off control even during high speed travel. The path connection control system in a CDMA mobile communication system determines a radio base station to establish a path for communication with a mobile terminal by a base station control unit. The base station control unit includes means for repeatedly inputting position information of said mobile terminal, means for deriving a current position, a traveling speed and a traveling direction of said mobile terminal on the basis of repeatedly input position information of said mobile terminal, a necessary path number map of predetermining necessary path number on the basis of a contour map. The base station control unit performs control for deriving necessary paths with taking information of current position, traveling speed and traveling direction of said mobile terminal and information from said necessary path number map and determining radio base stations to establish paths.

20 Claims, 10 Drawing Sheets

FIG.4A

| | | | | | | | | |
|---|---|---|---|---|---|---|---|---|
|1|1|1|1|1|1|1|1|1|
|1|1|1|1|1|1|1|1|1|
|1|1|1|1|1|1|1|1|1|
|1|1|3|3|3|2|2|2|2|2|
|1|1|3|3|3|1|1|1|1|
|1|1|3|3|3|2|2|2|2|2|
|1|1|1|2|1|1|1|1|1|
|1|1|1|2|1|1|1|1|1|
|1|1|1|2|1|1|1|1|1|
|1|1|1|2|1|1|1|1|1|

TRAVELING DIRECTION VARIATION RATIO

FIG.4B

| | | | | | | | | |
|---|---|---|---|---|---|---|---|---|
|1|1|2|2|1|1|1|1|1|
|1|1|2|2|1|1|1|1|1|
|1|1|2|2|1|1|1|1|1|
|1|1|2|1|1|1|1|1|1|
|1|1|3|3|3|3|3|3|3|
|1|1|3|3|3|3|3|3|3|
|1|1|3|3|3|3|3|3|3|
|1|1|2|3|1|1|1|1|1|
|1|1|2|3|1|1|1|1|1|
|1|1|2|3|1|1|1|1|1|
|1|1|2|3|1|1|1|1|1|

TRAVELING SPEED VARIATION RATIO

PATH CONNECTION CONTROL SYSTEM AND CONTROL METHOD THEREOF IN CDMA MOBILE COMMUNICATION SYSTEM

BACKGROUND OF THE INVENTION

1. Field of the Invention

The present invention relates to a path connection control system and control method thereof in a code division multiple access (CDMA) mobile communication system.

2. Description of the Related Art

It has been well known a mobile communication system, in which a mobile communication switching center is connected to a based station control unit through a wire circuit, a plurality of radio base stations are connected to the base station control unit through a wire circuit, and each base station is connected to a plurality of mobile terminals entering into a service area of an own station through radio circuits.

As a method for multiplexing radio communication paths in the mobile communication system, there has been known a code division multiple access (CDMA), in which information bit desired to communicate is multiplexed by spreading spectrum with several tens to several thousands bits of spreading code pattern, in addition to a frequency division multiple access (FDMA) or time division multiple access (TDMA).

CDMA is advantageous in strength against narrow barrage jamming and in capability of accommodating a plurality of paths within the same carrier wave. In current typical CDMA mobile communication system, a path connection system to establish a multiple paths for a plurality of radio base stations depending upon a condition of communication in call through one radio channel, has been employed. However, since CDMA uses a frequency band of low power in wide band, if number of paths is in excess of a certain number, radio signals arriving through such relatively large number of paths become mere noise. Therefore, connection control of the paths depending upon communication environment is particularly important in the CDMA mobile communication system.

FIG. 8 is an illustration for explaining path connection control of the conventional CDMA mobile communication system of this type.

In FIG. 8, the reference numeral 50 denotes mobile terminal (MS), 51 to 53 denote radio base stations (BTS), 54 denote a base station control unit (BSC), 58 denotes a mobile communication switching center (MSC).

On the other hand, in the base station control unit 54, the reference numeral 55 denotes a field intensity data extracting portion for extracting data of electric field intensity, 56 denotes a field intensity level monitoring portion for monitoring a field intensity level of the each radio base station based on the field intensity data, and 57 denotes a path setting control portion for determining path to be connected and path to be cut based on information from the field intensity level monitoring portion 56.

Next, path connection control of the CDMA mobile communication system shown in FIG. 8 will be discussed hereinafter.

Upon calling from the mobile terminal 50, a received field intensity of a pilot pattern transmitted from each radio base station 51 to 53 is measured in the mobile terminal 50 to establish call connection to the radio base station having the highest field intensity.

Here, it is assumed that the radio station having the highest field intensity is the radio base station 52, the radio terminal 50 at first establishes a path to the radio mobile station 52.

Even after establishing the path with the radio base station 52, the mobile terminal 50 continues measurement of the received field intensity of the pilot pattern to sequentially report information of measured field intensity of each radio base station to the base station control unit 54 through the path established with the radio base station 52.

In the base station control unit 54, data relating to the field intensity of each radio base station is extracted from the signal input from the radio base station 52 to feed the extracted data to the field intensity level monitoring portion 56 for monitoring the field intensity level of each radio base station in the field intensity level monitoring portion 56.

In hand off control while moving, when radio base station having field intensity level exceeding a threshold value to be a reference in establishing the path, newly appears, path is newly established to the newly appearing radio base station. Conversely, when the field intensity level of the radio base station, to which the path has already been established, is lowered to be lower than the threshold level to be the reference, the path to such radio base station is cut off.

Namely, in hand-off control in the conventional CDMA mobile communication system, path connection control is performed depending upon the actual field intensity level of each radio base station reported from the mobile terminal.

In the path connection control system in the conventional CDMA mobile communication system set forth above, since the path connection control is performed depending upon the actual field intensity level of each radio base station reported from the mobile terminal, the following problem is encountered.

At first, in order to re-establish paths depending upon high and low of actual field intensity level, hand-off control may cause delay when the mobile terminal is in motion at high speed to cause degradation of communication quality until completion of hand-off control.

Secondly, since path is uniformly established for the radio base stations having the field intensity level higher than or equal to the given level, the path is inherently established even for the radio base station temporarily passed through in a moment. On the other hand, in order to adapt to abrupt variation of communication environment, it becomes necessary to constantly establish a plurality of paths to waste communication resource.

It should be noted that, in Japanese Unexamined Patent Publication No. Heisei 7-322336, for "Hand-Off System for Cellular Telephone System", as shown in FIGS. 9, 10A and 10B, a position detector 518 for detecting a current position and traveling direction of the mobile terminal is provided in the mobile terminal 50, and a map data storage portion 522 for storing map data covering all cell area of the cellular phone system, a mobile terminal position information storage portion 521 for storing position information and traveling direction information detected by the position detector 518 and a mobile terminal traveling direction judgment portion 523 are provided in a control station 502.

The mobile terminal traveling direction judgment portion 523 detects the cell area where the mobile terminal moves with reference to the map data on the basis of the position information and traveling direction information when degradation of field intensity associating with movement of the mobile terminal is noticed to the mobile base station of the cell area where the mobile terminal is actually present.

The system disclosed in the above-identified publication has the radio base station map to perform hand-off after narrowing down the radio base stations to hand-off on the basis of traveling direction of the mobile terminal for effectively use a part of communication resource. However, even in this technology, the foregoing problem of delay in hand-off control during high speed travel cannot be resolved and effectiveness of use of communication resource is not satisfactory.

SUMMARY OF THE INVENTION

The present invention has been worked out in view of the drawbacks in the prior art set forth above. Therefore, it is an object of the present invention to provide a path connection control system and control method thereof in a CDMA mobile communication system which can establish minimum but sufficient paths without causing degradation of communication quality due to delay of hand off control even during high speed travel.

According to the first aspect of the present invention, a path connection control system in a CDMA mobile communication system for determining a radio base station to establish a path for communication with a mobile terminal by a base station control unit, the base station control unit comprises:

means for repeatedly inputting position information of the mobile terminal;

means for deriving a current position, a traveling speed and a traveling direction of the mobile terminal on the basis of repeatedly input position information of the mobile terminal;

a necessary path number map of predetermining necessary path number on the basis of a contour map, the base station control unit performing control for deriving necessary paths with taking information of current position, traveling speed and traveling direction of the mobile terminal and information from the necessary path number map and determining radio base stations to establish paths.

According to the second aspect of the present invention, a path connection control system in a CDMA mobile communication system for determining a radio base station to establish a path for communication with a mobile terminal by a base station control unit, the base station control unit comprises:

means for repeatedly inputting position information of the mobile terminal;

means for deriving current position, traveling speed and traveling direction of the mobile terminal based on repeatedly input position information of the mobile terminal, and predicting position, traveling speed and traveling direction of the mobile terminal in the near future;

a necessary path number map of predetermining necessary path number on the basis of a contour map, the base station control unit performing control for deriving necessary paths in the near further with taking information of current position, traveling speed and traveling direction of the mobile terminal, predicted information of position, traveling speed and traveling direction of the mobile terminal in the near future and information from the necessary path number map and determining radio base stations to establish paths.

According to the third aspect of the present invention, a path connection control method in a CDMA mobile communication system for determining a radio base station to establish a path for communication with a mobile terminal by a base station control unit, comprises:

first step of repeatedly inputting position information of the mobile terminal;

second step of deriving a current position, a traveling speed and a traveling direction of the mobile terminal on the basis of repeatedly input position information of the mobile terminal;

third step of providing a necessary path number map of predetermining necessary path number on the basis of a contour map, deriving necessary paths with taking information of current position, traveling speed and traveling direction of the mobile terminal and information from the necessary path number map and determining radio base stations to establish paths.

According to the fourth aspect of the present invention, a path connection control method in a CDMA mobile communication system for determining a radio base station to establish a path for communication with a mobile terminal by a base station control unit, comprises:

first step of repeatedly inputting position information of the mobile terminal;

second step of deriving current position, traveling speed and traveling direction of the mobile terminal based on repeatedly input position information of the mobile terminal, and predicting position, traveling speed and traveling direction of the mobile terminal in the near future;

third step of providing a necessary path number map of predetermining necessary path number on the basis of a contour map, deriving necessary paths in the near further with taking information of current position, traveling speed and traveling direction of the mobile terminal, predicted information of position, traveling speed and traveling direction of the mobile terminal in the near future and information from the necessary path number map and determining radio base stations to establish paths.

Preferably, the necessary path number map may be a necessary path number map based on a predicted traveling speed of the mobile terminal on the basis of the contour map. In the alternative, the necessary path number map may be a necessary path number map based on a predicted traveling direction variation ratio of the mobile terminal on the basis of the contour map. In a further alternative, necessary path number map may be a necessary path number map based on a predicted traveling speed variation ratio of the mobile terminal on the basis of the contour map. In a yet further alternative, necessary path number map may be a necessary path number map based on a predicted traveling speed of the mobile terminal, a necessary path number map based on a predicted traveling direction variation ratio of the mobile terminal on the basis of the contour map and a necessary path number map based on a predicted traveling speed variation ratio of the mobile terminal on the basis of the contour map.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIGS. 4A and 4B are also illustrations showing examples of necessary path number maps;

DESCRIPTION OF THE PREFERRED EMBODIMENT

Figure 1:
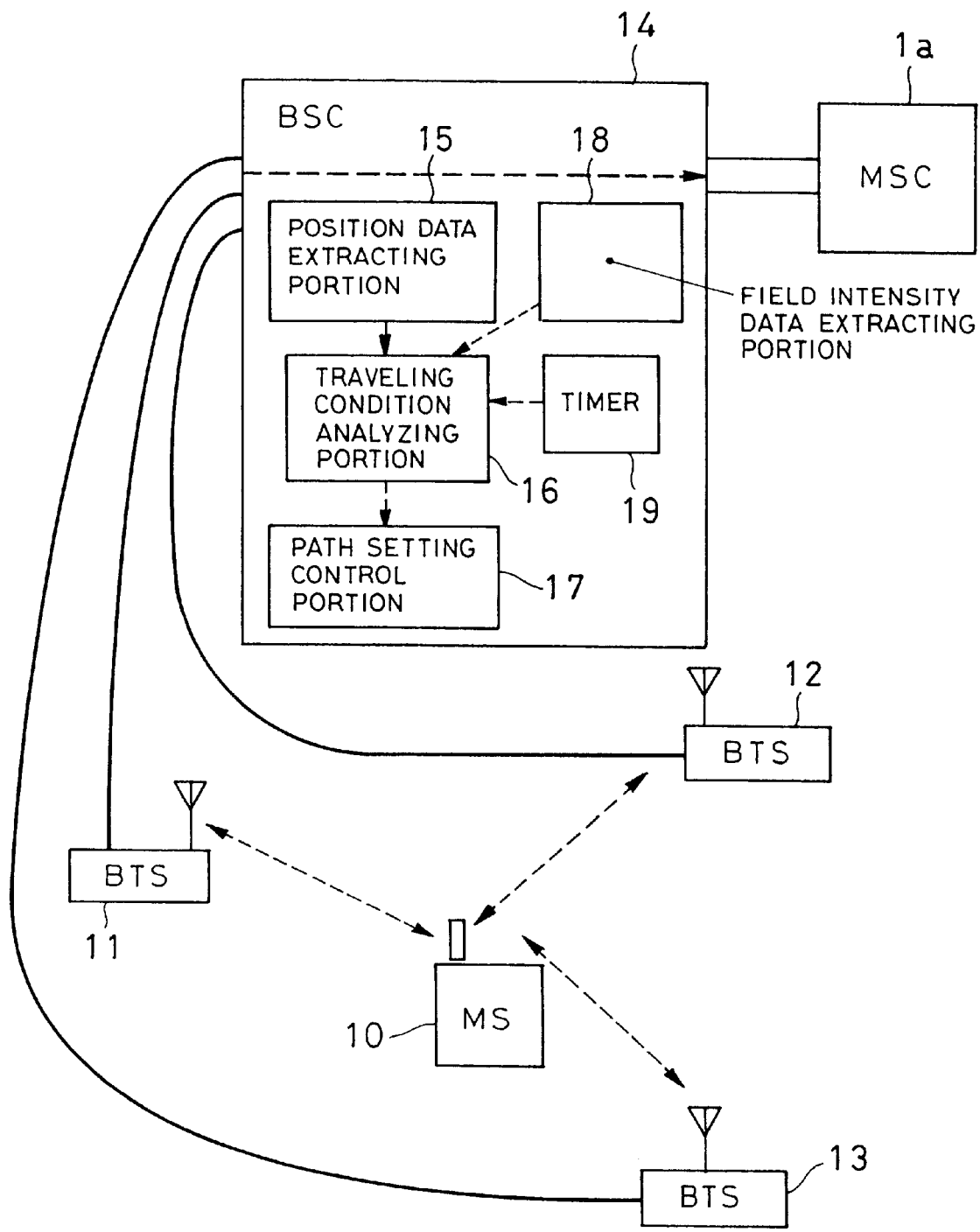
FIG. 1 is a block diagram showing a system construction for explaining a path connection control system in a CDMA mobile communication system according to the present invention.

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

First of all, a path connection control system in a CDMA mobile communication system according to the present invention is designed for establishing a minimum but sufficient path.

For this purpose, (i) When a stable path, even one in such a case that a mobile terminal is stopped at a place where the communication environment is good, for example, and when abrupt variation of stability of the path is not expected, it becomes necessary to cut off other paths which have already been established.

(ii) When a stable path is established but abrupt change of stability of the path is expected in such a case that the mobile station is in travel in a place where communication environment is good and possibility of varying traveling direction is high, it becomes necessary to establish a plurality of paths for preparation to abrupt variation of the traveling direction.

(iii) When the mobile terminal is in travel at high speed in a preliminarily expected traveling direction in such a case that phone call is made from a vehicle traveling on a highway, it becomes necessary to skip paths which are established only for short period.

On the other hand, secondly, the path connection control system in the CDMA mobile communication system according to the present invention, is designed for performing control in order to prevent delay in hand off control during high speed travel.

For this purpose, it is necessary to start hand off control predicting communication environment in the future other than predicting the field intensity level in the present during high speed travel.

Therefore, it is necessary to provide the means to be able to predict state transition of the mobile station up to the near future.

For this purpose, in the path connection control system in the CDMA mobile communication system according to the present invention, a necessary path number map preliminarily determined depending upon site condition (such as a necessary path number map depending upon the mobile speed based on a contour map, a necessary path number map based on traveling direction variation ratio, a necessary path number map depending upon speed variation ratio and so forth) are provided in a base station control unit, a current position of the mobile terminal, a traveling direction, a traveling speed, a traveling direction variation ratio, a traveling speed variation ratio, and one or all of position, traveling speed, traveling speed variation ratio and speed variation ratio of the mobile terminal in the near future are derived to add to a radio base station position data, radio base station electric field intensity data for deriving a necessary path by retrieving the necessary path number map with taking them as parameter, to perform connection control of the path.

An embodiment of the present invention will be discussed hereinafter with reference to the drawings.

In FIG. 1, the reference numeral 1a denotes a mobile communication switching center (MSC), 10 denotes a mobile terminal (MS), 11, 12 and 13 respectively denote radio base stations (BTS), and 14 denotes a base station control unit (BSC).

On the other hand, in the base station control unit 14, the reference numeral 15 denotes a position data extracting portion, 16 denotes a traveling condition analyzing portion, 17 denotes a path setting control portion, 18 denotes a field intensity data extracting portion, and 19 denotes a timer.

It should be noted that broken line portions between the mobile terminal 10 and respective radio base stations 11, 12 and 13 are radio zones. Between respective radio base stations and the base station control unit 14 and between the base station control unit 14 and the mobile communication switching center la are fixed-line zones.

The position data extracting portion 15 performs operation for extracting position data of the mobile terminal 10 reported from the mobile terminal 10 among signals input from the base station control unit 14.

On the other hand, the field intensity data extracting portion 18 performs operation for extracting field intensity data of respective base station reported from the mobile terminal 10 among the signals input to the base station control unit 14.

Also, from the timer, a time, at which the position data is extracted, is input.

In the traveling condition analyzing portion 16, a position data of the mobile terminal from the position data extracting portion 15, a field intensity data of each base station from the field intensity data extracting portion 18 and a time from the timer 19 are appropriately input and updated.

On the other hand, in the traveling condition analyzing portion 16, various map information and radio base station position information which will be discussed later, are provided. With taking these data as parameters, state transition of the mobile station up to the near future is predicted to perform operation for controlling the path setting control portion 17.

Figure 2:
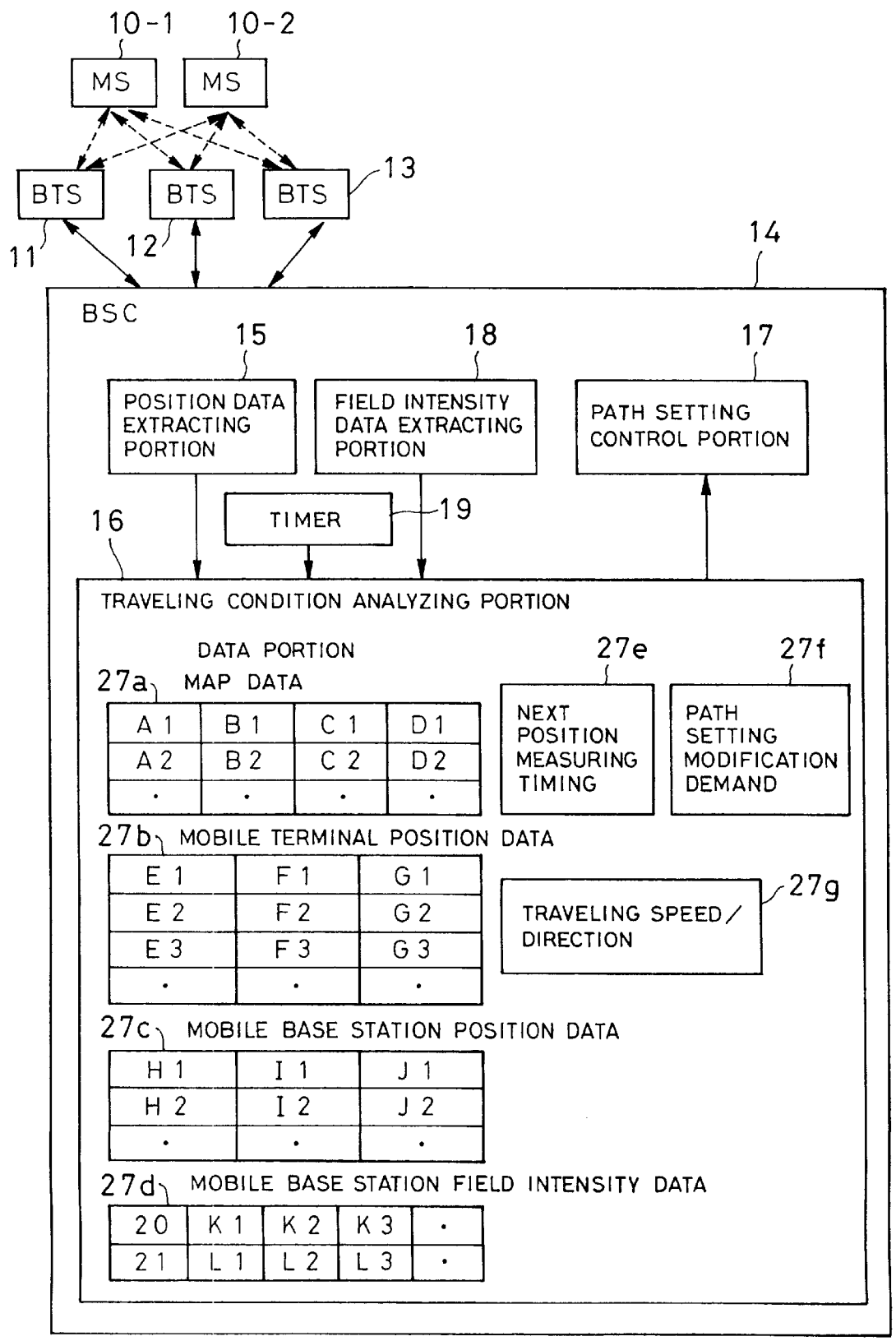
FIG. 2 is an illustration showing a detailed constriction of a moving condition analyzing portion shown in FIG. 1.

FIG. 2 is an illustration showing a detailed construction of the traveling condition analyzing portion 16 shown in FIG. 1. In the following discussion, like reference numerals to those in FIG. 1 identify like elements and detailed discussion for such common element will be neglected for keeping the disclosure simple enough to facilitate clear understanding of the present invention.

In the traveling condition analyzing portion 16, various map data 27a, a mobile terminal position data 27b, amobile base station position data 27c, amobile base station field intensity data 27d are provided. A traveling speed and direction of the mobile terminal 27g are derived using the mobile terminal position data 27b, for outputting next position measurement timing 27e and path setting modification demand 27f with taking these as parameter.

Here, the map data 27a and the radio base station position data 27c are data relating to cells in hand of the base station control unit 14, and are fixed data preliminarily provided irrespective of the state of the mobile terminal.

An to Dn in the map data 27a are data on various maps, in which An are position data of the mobile terminal on the contour map, in which buildings, stations, roads, railways and so forth are shown in detail, Bn are data on the necessary path number map based on the traveling speed predicted from the contour map A, Cn are data on the necessary path number map based on the traveling direction variation ratio predicted from the contour map A, and Dn are data on the necessary path number map based on the speed variation ratio predicted from the contour map A.

On the other hand, in the radio station position data 27c, Hn represents a position of the radio base station, In denotes an area required to establish a path generally for the field intensity higher than or equal to a predetermined level, Jn denotes an area required to cut off the path generally for the field intensity lower than or equal to the predetermined level. (It should be noted that the setting of these areas I and J may be set uniformly depending upon a physical distance from the radio base station.

Figure 3B:
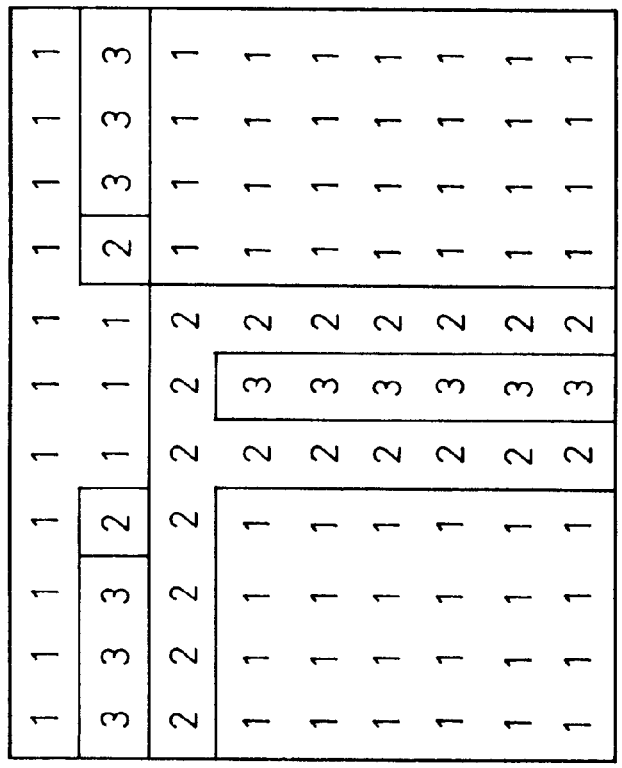
FIGS. 3A and 3B are illustrations showing examples of necessary path number maps.
Figure 3A:
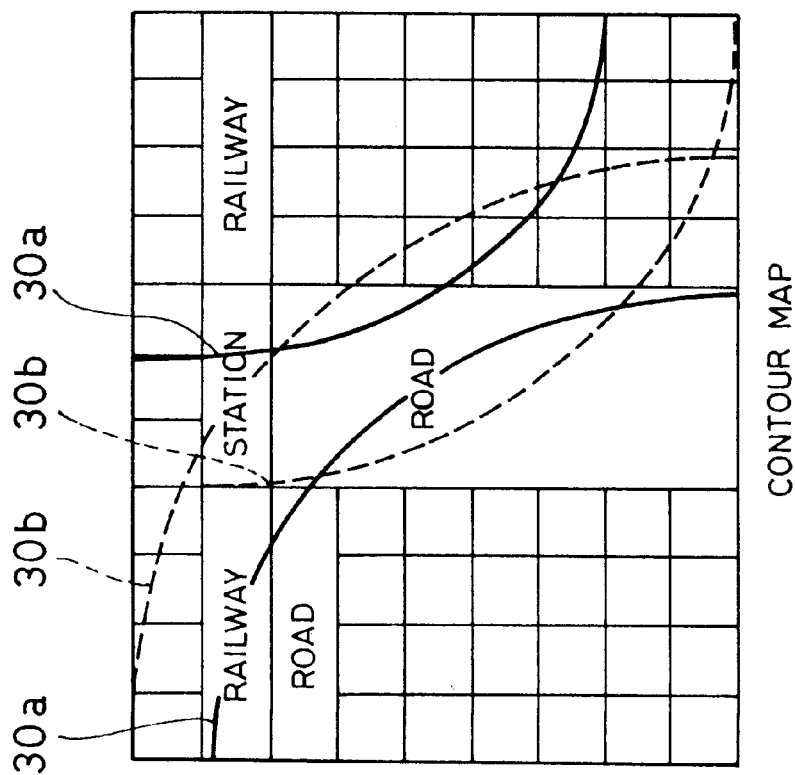

FIGS. 3A, 3B, 4A and 4B, there are shown examples of the necessary path number maps. FIG. 3A is a necessary path number map based on the contour map, FIG. 3B is a necessary path number map based on the traveling speed, FIG. 4A is a necessary path number map based on traveling direction variation ratio and FIG. 4B is a necessary path number map based on the speed variation ratio. (It should be noted that numerical values "1" to "3" on respective maps do not represent required number of paths but merely show ratio of necessity "3">"2">"1").

For example, on the contour map shown in FIG. 3A, when a wide road, narrow word, the railway, station and so forth are present, in the necessary path number map of FIG. 3B based on the traveling speed, the mobile terminal located on the railway or the center the wide road, the mobile terminal is expected to travel at high speed. Therefore, in such case, the necessary path number is set at "3". On the other hand, on the narrow road or either side of the wide road, the necessary path number is set at "2". Also, in the station or other place, the mobile terminal is not expected to travel at high speed, the necessary path number is set at "1".

In case of the necessary path number map of FIG. 4A based on the traveling direction variation ratio, there is high possibility of changing the traveling direction in the station or the road in front of the station. Therefore, the necessary path number is set at "3", in the narrow road or either side of the wide road, the necessary path is set at "2". On the railway or the wide road, the necessary path number is set at "1" at the center of the wide road.

In case of the necessary path number map of FIG. 4B based on the speed variation ratio, possibility of varying the traveling speed is high on the road or the station, the necessary path number is set at "3". On the railway, the possibility of variation of the traveling speed is expected to be medium level, thus, the necessary path number is set at "2". On other place, the necessary path number is set at "1".

It should be appreciated that the necessary path number map with reference to the contour as shown in FIG. 3A, only areas 30a to establish the paths and areas 30b to cut off the paths are shown.

On the other hand, the mobile terminal position data 27b and the radio base station field intensity data 27d in the traveling condition analyzing portion 16 in FIG. 2 are data obtained by demanding measurement to the mobile terminals 10-1 and 10-2 via the radio base stations to which the paths are established, from the base station control unit 14 and storing the measured data as a result of measurement.

It should be noted that En of the mobile terminal position data 27b is a kind of the mobile terminal, Fn is a current position of the mobile terminal, Gn is a data reception time, Kn in the radio base station field intensity data 27d are listing of the field intensity of the radio base station in the mobile terminal 10-1 and Ln are listing of the field intensity of the radio base station in the mobile terminal 10-2.

Figure 5:
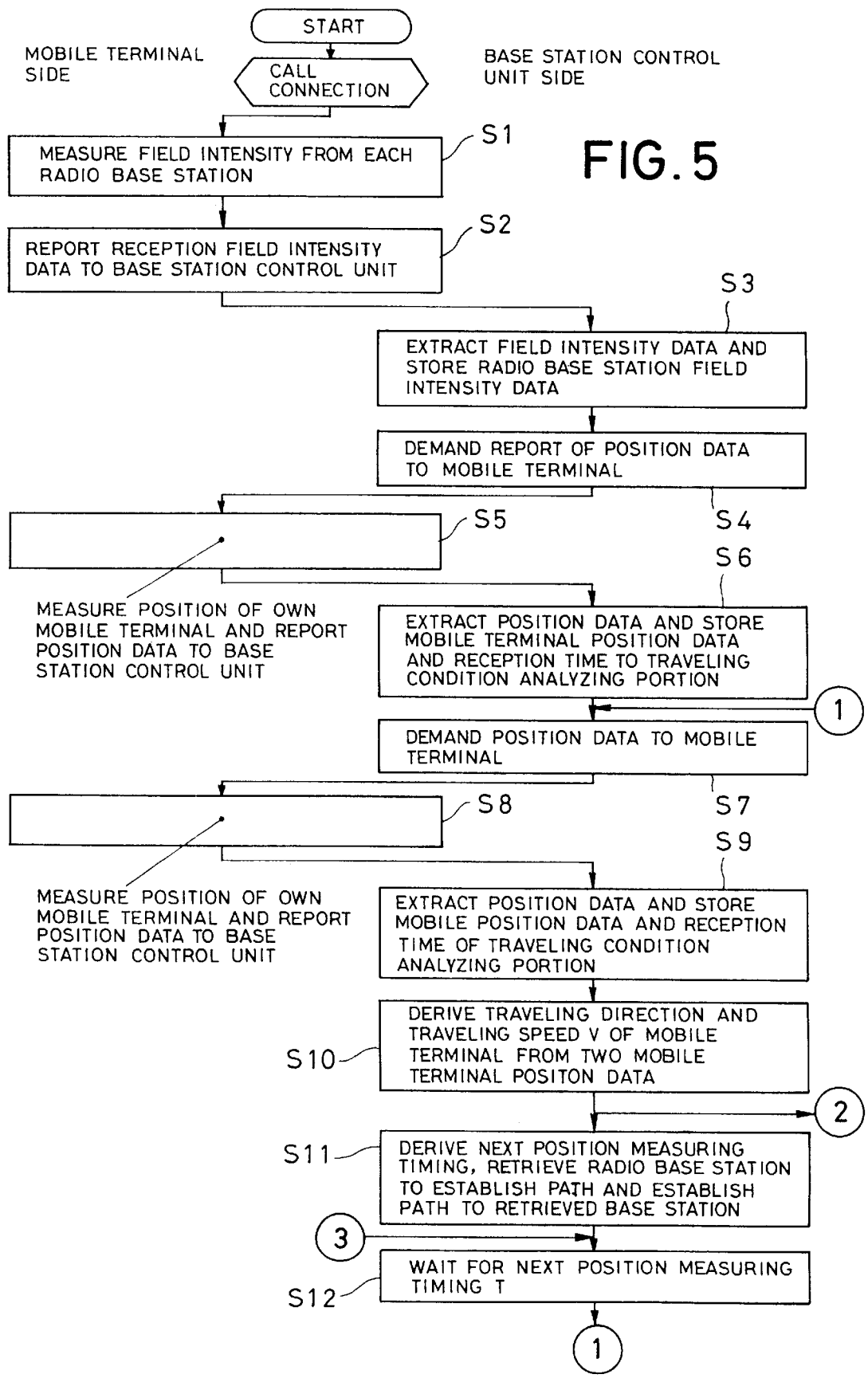
FIG. 5 is a flowchart for explaining operation of the shown embodiment.
Figure 6:
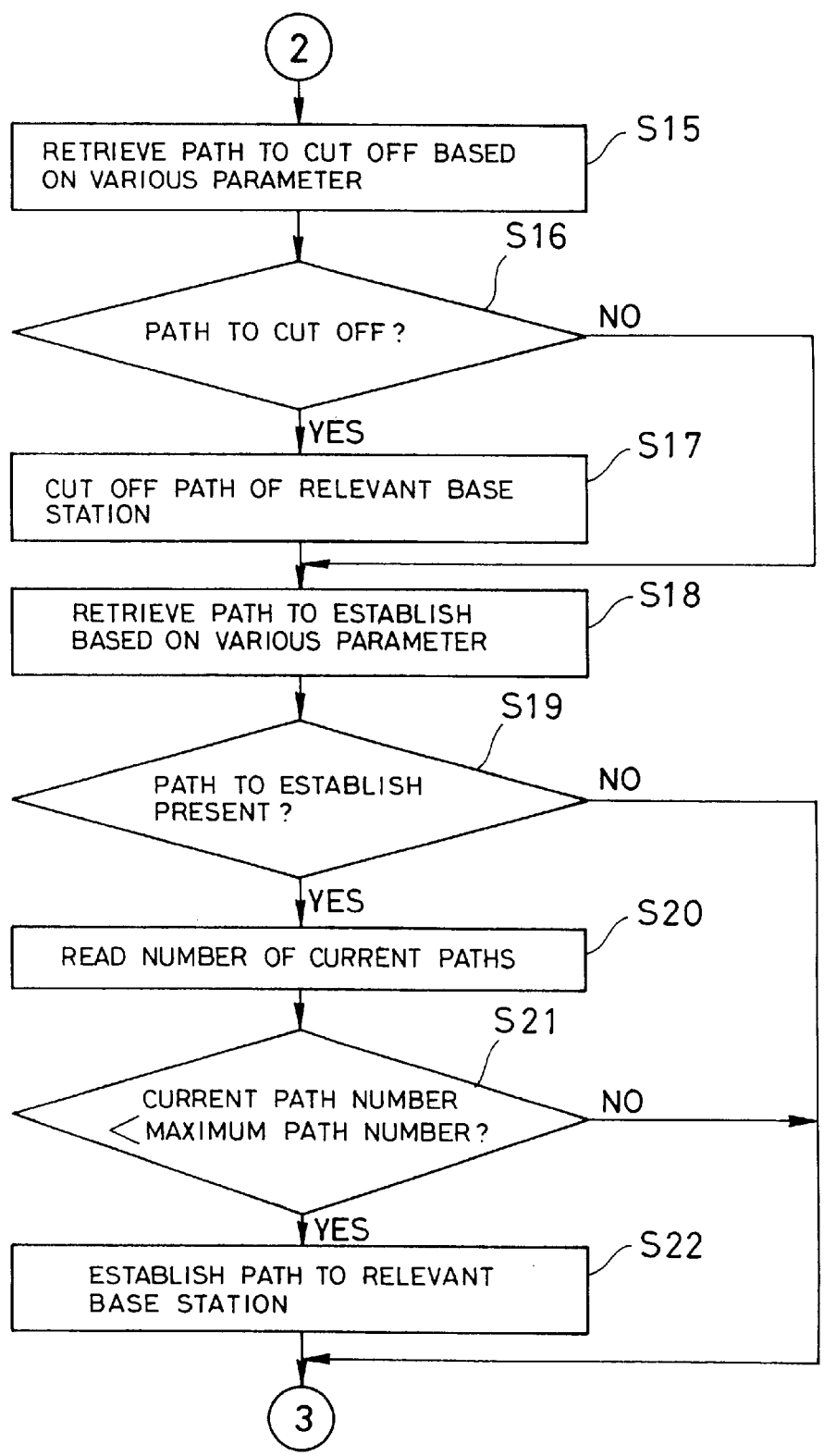
FIG. 6 is a flowchart for explaining operation of the shown embodiment.

Next, operation of the shown embodiment will be discussed with reference to the flowcharts of FIGS. 5 and 6.

Upon calling from the mobile terminal 10, reception field intensities of the pilot pattern transmitted from respective radio base stations 11 to 13 are measured to establish call connection with the radio base station having the highest field intensity.

Here, assuming that the radio base station having the highest field intensity is the radio base station 12, the mobile terminal 10, at first, establishes the path with the radio base station 12.

On the other hand, the mobile terminal 10 subsequently continue measurement of the reception field intensity of the pilot pattern (S1) to sequentially report the measured field intensity information of the radio base stations to the base station control unit 14 through the path established with the radio base station 12 (S2).

In the radio base station control unit 14, among the signals input from the radio base station 12, data relating to the field intensity of respective radio base station is extracted by the field intensity data extracting portion 18 to feed the extracted data to the traveling condition analyzing portion 16 to store as the field intensity data 27d of respective radio base station of the traveling condition analyzing portion 16 (S3).

Next, in the base station control unit 14, report of a position data is demanded to the mobile terminal 10 (S4).

Then, in the mobile terminal 10 receiving such demand, the position of the own mobile terminal is measured to report the position data to the base station control unit 14 (S5).

It should be noted that a typical method for measuring the position of the own mobile terminal is to derive a radio arrival time difference from three or more radio base stations. However, it is also possible to mount a GPS receiver on the mobile terminal 10 to measure the position by GPS.

Figure 7:
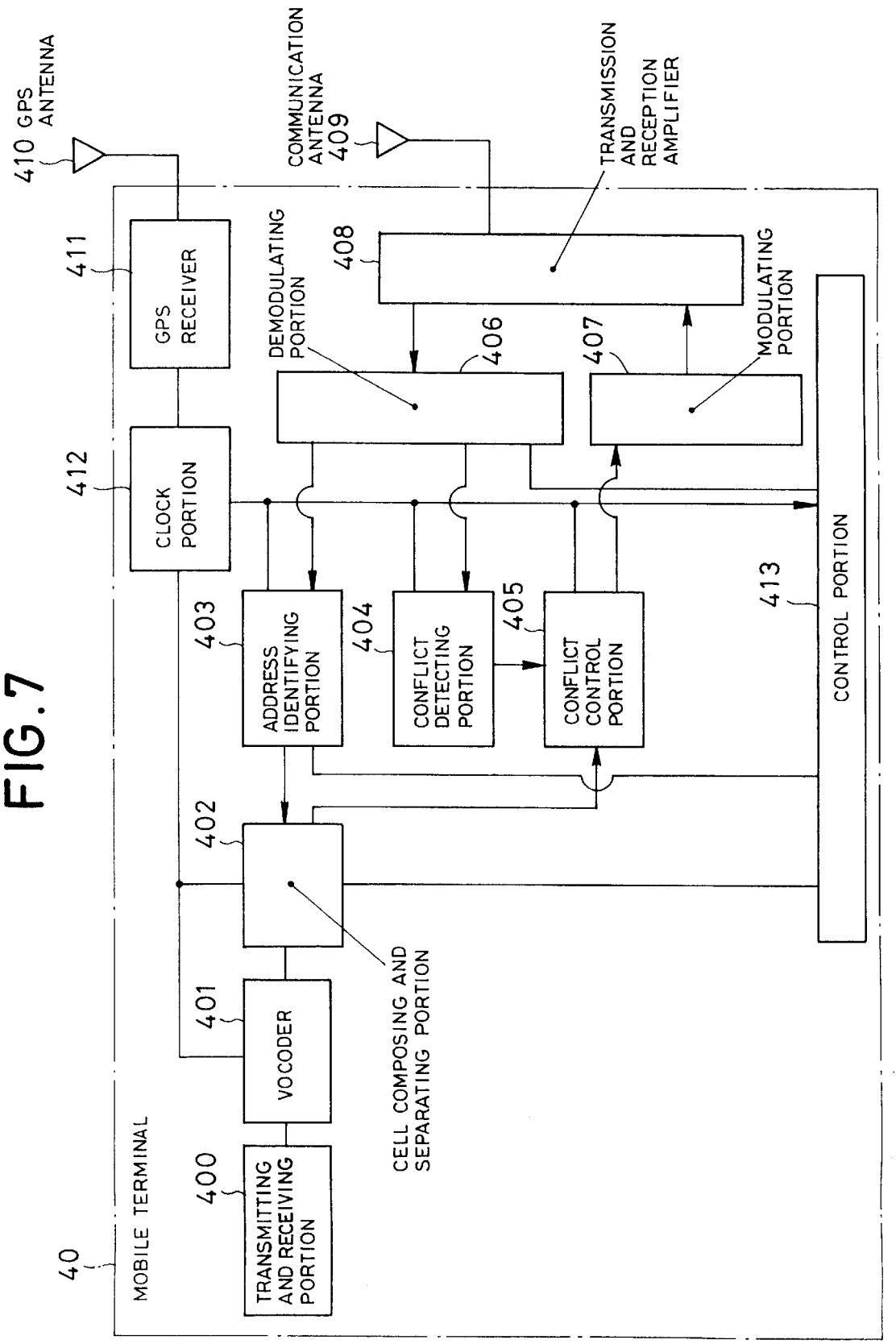
FIG. 7 is a block diagram showing one example of a construction of a mobile terminal to be used in the shown embodiment.
Figure 8:
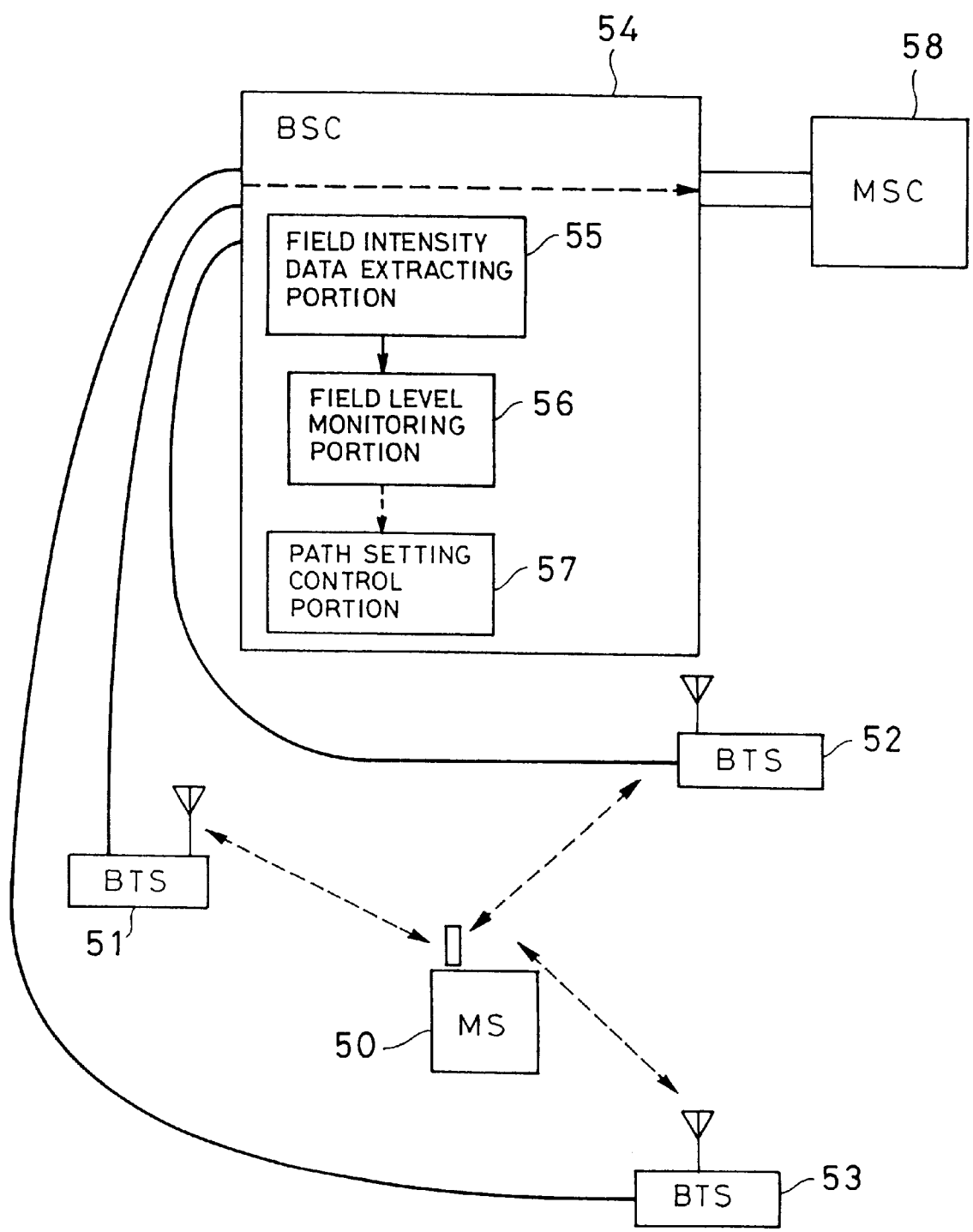
FIG. 8 is an illustration for explaining one example of a path connection control system in the conventional CDMA mobile communication system.
Figure 9:
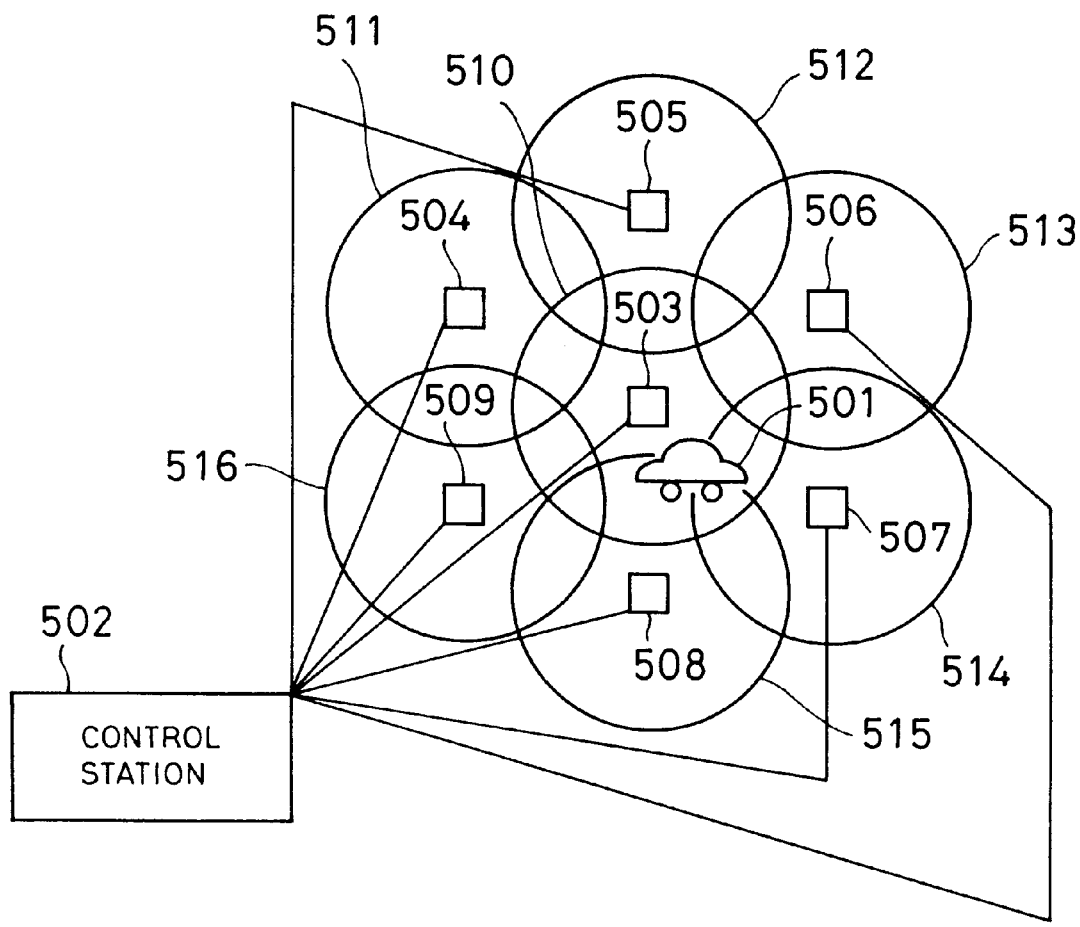
FIG. 9 is an illustration for explaining the prior art.
Figure 10A:
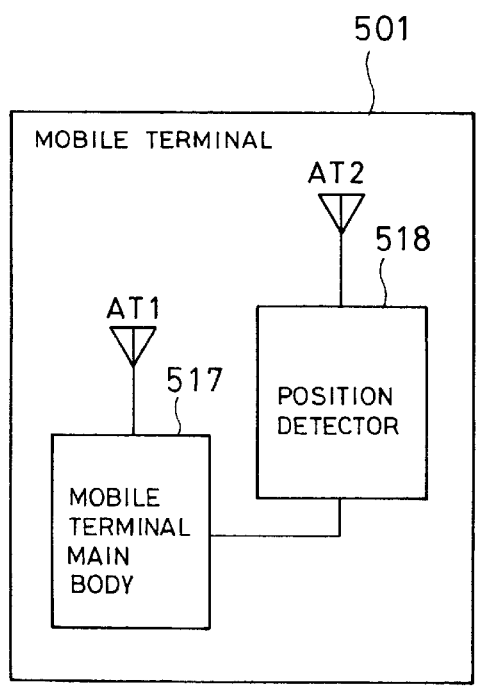
FIGS. 10A and 10B are illustrations for explaining the prior art.
Figure 10B:
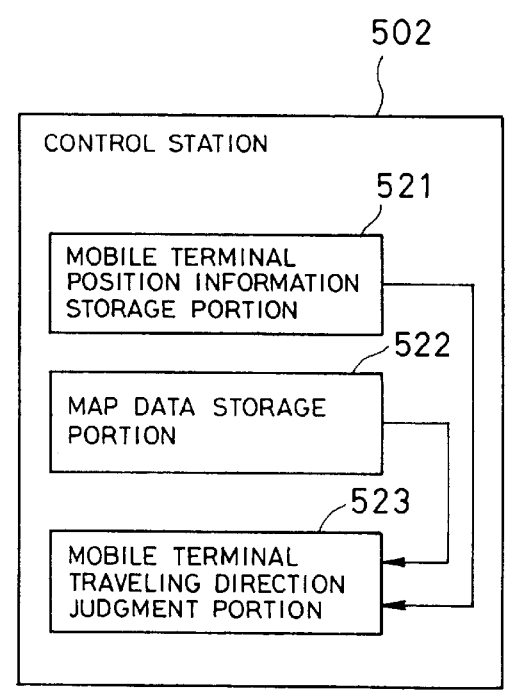

FIG. 7 shows one example of a construction of the mobile terminal 10 mounting the GPS receiver.

Referring to FIG. 7, amobile terminal 40 is constructed with a transmitting and receiving portion 400, a vocoder portion 401, a cell composing and separating portion 402, an address identifying portion 403, a conflict detecting portion 404, a conflict control portion 405, a demodulating portion 406, a modulating portion 407, a transmission and reception amplifier portion 408, a communication antenna 409, a GPS antenna 410 and a GPS receiver 411. Positioning signals from GPS satellites are received by the GPS receiver 411 through the GPS antenna 410 for measuring the position of the mobile terminal 40 by the GPS receiver 411.

In the base station control unit 14, the position data is extracted by the position data extracting portion 15 among the signal input from the radio base station 12 to store the mobile terminal position data and the reception time in the mobile terminal position data 27b of the traveling condition analyzing portion 16 (S6).

Then, in the base station control unit 14, after elapse of a predetermined period, reporting of the position data is again demanded to the mobile terminal 10 (S7). In response to this, the mobile terminal 10 reports the position data to the base station control unit 14 (S8) to again store the mobile terminal position data together with the reception time in the traveling condition analyzing portion 16 in the base station control unit 14 (S9).

Then, in the traveling condition analyzing portion 16, a traveling direction and traveling speed V of the mobile terminal is derived on the basis of stored two position data and a time difference of two reception times of respective of two position data (S10). Also, in view of other predicted parameter values (such as current variation ratio of the current traveling direction and current variation ratio of the traveling speed of the mobile terminal 10, and one of or all of position, traveling direction, traveling speed, traveling direction variation ratio, speed variation ratio of the near future), next position measurement timing T of the mobile terminal 10 is derived. In conjunction therewith, the radio base stations to establish the paths are retrieved for establishing paths (S11). Then, the next position measuring timing T is waited (S12).

On the other hand, when state transition is cased due moving of the mobile terminal 10 or in other reason, path to be cut off is retrieved based on various parameter values (S15). If path to be cut off is present (S16), the path of the relevant radio base station is cut off (S17).

On the other hand, in the next step S18, paths to be established is retrieved by respective parameters. When path to establish is present (S19). number of current paths is read out (S20). If number of current paths is smaller than the predetermined maximum path number (S21), path is established with the relevant base station (S22).

Namely, the path connection control system in the CDMA mobile communication system according to the present invention, the position information of the mobile terminal is sequentially input to derive the position, traveling speed and the traveling direction of the mobile terminal, the current variation ratios of the traveling direction and speed of the mobile terminal, and to predict traveling speed, traveling direction variation ratio, traveling speed variation ratio of the mobile terminal in the near future for determining the path to establish and cut off with taking one or all of these parameters to perform path connection control. Therefore, degradation of communication quality due to delay of hand of f control can be prevented and wasting of communication resource by establishing unnecessary paths can also be prevented.

In the path connection control system in the CDMA mobile communication system of the present invention, current traveling direction variation ratio and traveling speed variation ratio of the mobile terminal and position, traveling speed, traveling direction variation ratio and traveling speed variation ratio of the mobile terminal in the near future are derived by the map preliminarily prepared by the contour map to enable adaptation in high speed travel.

It should be appreciated that while the foregoing embodiment employs three maps, i.e. the map based on the predicted traveling speed, the map based on the predicted traveling speed variation ratio and map based on the predicted speed variation ratio, as map preliminarily prepared on the basis of the contour map, these is merely one embodiment. Any maps of the parameters to be parameters for path connection control may be included.

As set forth above, the path connection control system in the CDMA mobile communication system of the present invention is constructed to determine the base stations to establish the path by predicting the state transition of the mobile terminal in the near future. Therefore, it becomes possible to smoothly perform hand off even in high speed travel of the mobile terminal to prevent degradation of communication quality due to delay of hand off control.

On the other hand, even to the radio base station having high field intensity, unnecessary path is not established. Therefore, control to minimize the paths to establish can be performed to effectively use communication resource.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A path connection control system in a CDMA mobile communication system for determining a radio base station to establish a path for communication with a mobile terminal by a base station control unit, said base station control unit comprising:
   an input circuit for repeatedly inputting position information of said mobile terminal;
   a processor for deriving a current position, a traveling speed and a traveling direction of said mobile terminal on the basis of repeatedly input position information of said mobile terminal;
   a necessary path number map of predetermining necessary path number on the basis of a contour map;
   wherein said base station control unit derives a plurality of necessary paths based on information of current position, traveling speed and traveling direction of said mobile terminal and information from said necessary path number map and causes radio base stations to establish paths, said base station control unit skipping paths which are predicted to be established for less than a predetermined period.

2. A path connection control system in a CDMA mobile communication system as set forth in claim 1, wherein said necessary path number map is a necessary path number map based on a predicted traveling speed of said mobile terminal on the basis of the contour map.

3. A path connection control system in a CDMA mobile communication system as set forth in claim 1, wherein said necessary path number map is a necessary path number map based on a predicted traveling direction variation ratio of said mobile terminal on the basis of the contour map.

4. A path connection control system in a CDMA mobile communication system as set forth in claim 1, wherein said necessary path number map is a necessary path number map based on a predicted traveling speed variation ratio of said mobile terminal on the basis of the contour map.

5. A path connection control system in a CDMA mobile communication system as set forth in claim 1, wherein said necessary path number map is a necessary path number map based on a predicted traveling speed of said mobile terminal, a necessary path number map based on a predicted traveling direction variation ratio of said mobile terminal on the basis of the contour map and a necessary path number map based on a predicted traveling speed variation ratio of said mobile terminal on the basis of the contour map.

6. A path connection control system in a CDMA mobile communication system for determining a radio base station to establish a path for communication with a mobile terminal by a base station control unit, said base station control unit comprising:

means for repeatedly inputting position information of said mobile terminal;

means for deriving current position, traveling speed and traveling direction of said mobile terminal based on repeatedly input position information of said mobile terminal, and predicting position, traveling speed and traveling direction of said mobile terminal in the near future;

a necessary path number map of predetermining necessary path number on the basis of a contour map, said base station control unit performing control for deriving necessary paths in the near further with taking information of current position, traveling speed and traveling direction of said mobile terminal, predicted information of position, traveling speed and traveling direction of the mobile terminal in the near future and information from said necessary path number map and determining radio base stations to establish paths.

7. A path connection control system in a CDMA mobile communication system as set forth in claim 6, wherein said necessary path number map is a necessary path number map based on a predicted traveling speed of said mobile terminal on the basis of the contour map.

8. A path connection control system in a CDMA mobile communication system as set forth in claim 6, wherein said necessary path number map is a necessary path number map based on a predicted traveling direction variation ratio of said mobile terminal on the basis of the contour map.

9. A path connection control system in a CDMA mobile communication system as set forth in claim 6, wherein said necessary path number map is a necessary path number map based on a predicted traveling speed variation ratio of said mobile terminal on the basis of the contour map.

10. A path connection control system in a CDMA mobile communication system as set forth in claim 6, wherein said necessary path number map is a necessary path number map based on a predicted traveling speed of said mobile terminal, a necessary path number map based on a predicted traveling direction variation ratio of said mobile terminal on the basis of the contour map and a necessary path number map based on a predicted traveling speed variation ratio of said mobile terminal on the basis of the contour map.

11. A path connection control method in a CDMA mobile communication system for determining a radio base station to establish a path for communication with a mobile terminal by a base station control unit, comprising the steps of:

repeatedly inputting position information of said mobile terminal;

deriving a current position, a traveling speed and a traveling direction of said mobile terminal on the basis of repeatedly input position information of said mobile terminal; and providing a necessary path number map of predetermined necessary path number on the basis of a contour map, deriving a plurality of necessary paths with taking information of current position, traveling speed and traveling direction of said mobile terminal and information from said necessary path number map and determining radio base stations to establish paths, wherein paths predicted to be established for less than a predetermined period are skipped.

12. A path connection control method in a CDMA mobile communication system as set forth in claim 11, wherein said necessary path number map is a necessary path number map based on a predicted traveling speed of said mobile terminal on the basis of the contour map.

13. A path connection control method in a CDMA mobile communication system as set forth in claim 11, wherein said necessary path number map is a necessary path number map based on a predicted traveling direction variation ratio of said mobile terminal on the basis of the contour map.

14. A path connection control method in a CDMA mobile communication system as set forth in claim 11, wherein said necessary path number map is a necessary path number map based on a predicted traveling speed variation ratio of said mobile terminal on the basis of the contour map.

15. A path connection control method in a CDMA mobile communication system as set forth in claim 11, wherein said necessary path number map is a necessary path number map based on a predicted traveling speed of said mobile terminal, a necessary path number map based on a predicted traveling direction variation ratio of said mobile terminal on the basis of the contour map and a necessary path number map based on a predicted traveling speed variation ratio of said mobile terminal on the basis of the contour map.

16. A path connection control method in a CDMA mobile communication system for determining a radio base station to establish a path for communication with a mobile terminal by a base station control unit, comprising:

first step of repeatedly inputting position information of said mobile terminal;

second step of deriving current position, traveling speed and traveling direction of said mobile terminal based on repeatedly input position information of said mobile terminal, and predicting position, traveling speed and traveling direction of said mobile terminal in the near future;

third step of providing a necessary path number map of predetermining necessary path number on the basis of a contour map, deriving necessary paths in the near further with taking information of current position, traveling speed and traveling direction of said mobile terminal, predicted information of position, traveling speed and traveling direction of the mobile terminal in the near future and information from said necessary path number map and determining radio base stations to establish paths.

17. A path connection control method in a CDMA mobile communication system as set forth in claim 16, wherein said necessary path number map is a necessary path number map based on a predicted traveling speed of said mobile terminal on the basis of the contour map.

18. A path connection control method in a CDMA mobile communication system as set forth in claim 16, wherein said necessary path number map is a necessary path number map based on a predicted traveling direction variation ratio of said mobile terminal on the basis of the contour map.

19. A path connection control method in a CDMA mobile communication system as set forth in claim 16, wherein said necessary path number map is a necessary path number map based on a predicted traveling speed variation ratio of said mobile terminal on the basis of the contour map.

20. A path connection control method in a CDMA mobile communication system as set forth in claim 16, wherein said necessary path number map is a necessary path number map based on a predicted traveling speed of said mobile terminal, a necessary path number map based on a predicted traveling direction variation ratio of said mobile terminal on the basis of the contour map and a necessary path number map based on a predicted traveling speed variation ratio of said mobile terminal on the basis of the contour map.

* * * * *